US012806841B2

(12) United States Patent
Lettowsky et al.

(10) Patent No.: US 12,806,841 B2
(45) Date of Patent: Nov. 24, 2026

(54) FILM BLOWING MACHINE AND METHOD FOR PRODUCING A FILM WEB

(71) Applicant: Reifenhäuser GmbH & Co. KG Maschinenfabrik, Troisdorf (DE)

(72) Inventors: Christoph Lettowsky, Aachen (DE); Peter Fischer, Bonn (DE); Fabian Nentwig, Lohmar (DE); Andreas Neuss, Worms (DE)

(73) Assignee: REIFENHÄUSER GMBH & CO. KG MASCHINENFABRIK, Troisdorf (DE)

( * ) Notice: Subject to any disclaimer, the term of this patent is extended or adjusted under 35 U.S.C. 154(b) by 121 days.

(21) Appl. No.: 18/722,674

(22) PCT Filed: Dec. 22, 2022

(86) PCT No.: PCT/DE2022/100976
§ 371 (c)(1),
(2) Date: Jun. 21, 2024

(87) PCT Pub. No.: WO2023/116984
PCT Pub. Date: Jun. 29, 2023

(65) Prior Publication Data

US 2025/0100199 A1 Mar. 27, 2025

(30) Foreign Application Priority Data

Dec. 22, 2021 (DE) ..................... 10 2021 134 416.6

(51) Int. Cl.
*B29C 48/00* (2019.01)
*B29C 48/08* (2019.01)
(Continued)

(52) U.S. Cl.
CPC .......... *B29C 48/0018* (2019.02); *B29C 48/08* (2019.02); *B29C 48/92* (2019.02);
(Continued)

(58) Field of Classification Search
CPC ..... B29C 48/0018; B29C 48/08; B29C 48/92; B29C 55/28; B29C 48/69; B29C 48/767;
(Continued)

(56) References Cited

U.S. PATENT DOCUMENTS 5,122,315 A * 6/1992 Darley .................. B29C 48/395
700/196
5,423,455 A * 6/1995 Ricciardi .................. B29B 7/60
73/434
(Continued)

FOREIGN PATENT DOCUMENTS

DE 4405552 A1 * 10/1995 ............ B29C 48/69
DE 102006019445 A1 10/2007
(Continued)

OTHER PUBLICATIONS

English translation of DE-4405552-A1 by EPO. (Year: 1995).*
English translation of JP-H05286011-A by EPO. (Year: 1993).*

*Primary Examiner* — Inja Song
(74) *Attorney, Agent, or Firm* — Shumaker, Loop & Kendrick, LLP

(57) ABSTRACT

A film blowing machine for producing a film web from a recycled material having •a.-an extruder for melting and homogenizing the recycled material into a melt, •b. an annular die for extruding a film tube, •c. a guide for a melt flow between the extruder and the annular die via an annular die melt pump, for conveying the melt to the annular die, •d. a tube-forming zone for longitudinal and transverse drawing of the film tube, •e. a cooling means for the film tube moving in the machine direction, •f. a flattening unit on the other side of the tube-forming zone for flattening the film tube into a double layer film web, •g. a pair of draw-off rollers on the other side of the cooling means for drawing off the film tube, and •h. the extruder is designed as a twin-screw extruder.

37 Claims, 1 Drawing Sheet

(51) Int. Cl.

| | |
|---|---|
| ***B29C 48/69*** | (2019.01) |
| ***B29C 48/76*** | (2019.01) |
| ***B29C 48/92*** | (2019.01) |
| ***B29C 55/28*** | (2006.01) |
| ***B29K 105/26*** | (2006.01) |

(52) U.S. Cl.
CPC .............. *B29C 55/28* (2013.01); *B29C 48/69* (2019.02); *B29C 48/767* (2019.02); *B29C 2948/92019* (2019.02); *B29C 2948/9238* (2019.02); *B29C 2948/92514* (2019.02); *B29C 2948/92876* (2019.02); *B29K 2105/26* (2013.01)

(58) Field of Classification Search
CPC .. B29C 2948/92019; B29C 2948/9238; B29C 2948/92514; B29C 2948/92876; B29C 2948/92076; B29C 2948/9218; B29C 2948/92333; B29C 2948/9259; B29C 2948/926; B29C 48/2692; B29C 48/2725; B29C 48/277; B29C 48/286; B29C 48/287; B29C 48/40; B29K 2105/26
See application file for complete search history.

(56) References Cited

U.S. PATENT DOCUMENTS

| | | | | |
|---|---|---|---|---|
| 5,649,785 | A * | 7/1997 | Djerf | B09B 3/35 405/129.27 |
| 2002/0177631 | A1* | 11/2002 | Berghaus | B29C 44/569 521/55 |
| 2013/0119575 | A1* | 5/2013 | Whaley | B02C 18/146 241/98 |
| 2013/0229888 | A1* | 9/2013 | Asagiri | B29C 48/395 366/77 |
| 2014/0334749 | A1* | 11/2014 | Borchardt | B29C 48/10 264/241 |
| 2021/0008763 | A1* | 1/2021 | Gnam | B29C 48/762 |
| 2022/0040886 | A1* | 2/2022 | Hagen | B29C 48/92 |
| 2022/0193957 | A1* | 6/2022 | Kujawa | B29B 17/0412 |

FOREIGN PATENT DOCUMENTS

| | | | | | |
|---|---|---|---|---|---|
| EP | 2631060 | A1 | * | 8/2013 | B29C 48/76 |
| GB | 2249987 | A | * | 5/1992 | B29C 48/40 |
| JP | H05286011 | A | * | 11/1993 | B29B 7/60 |
| WO | 2016059572 | A2 | | 4/2016 | |
| WO | 2016059572 | A3 | | 4/2016 | |

* cited by examiner

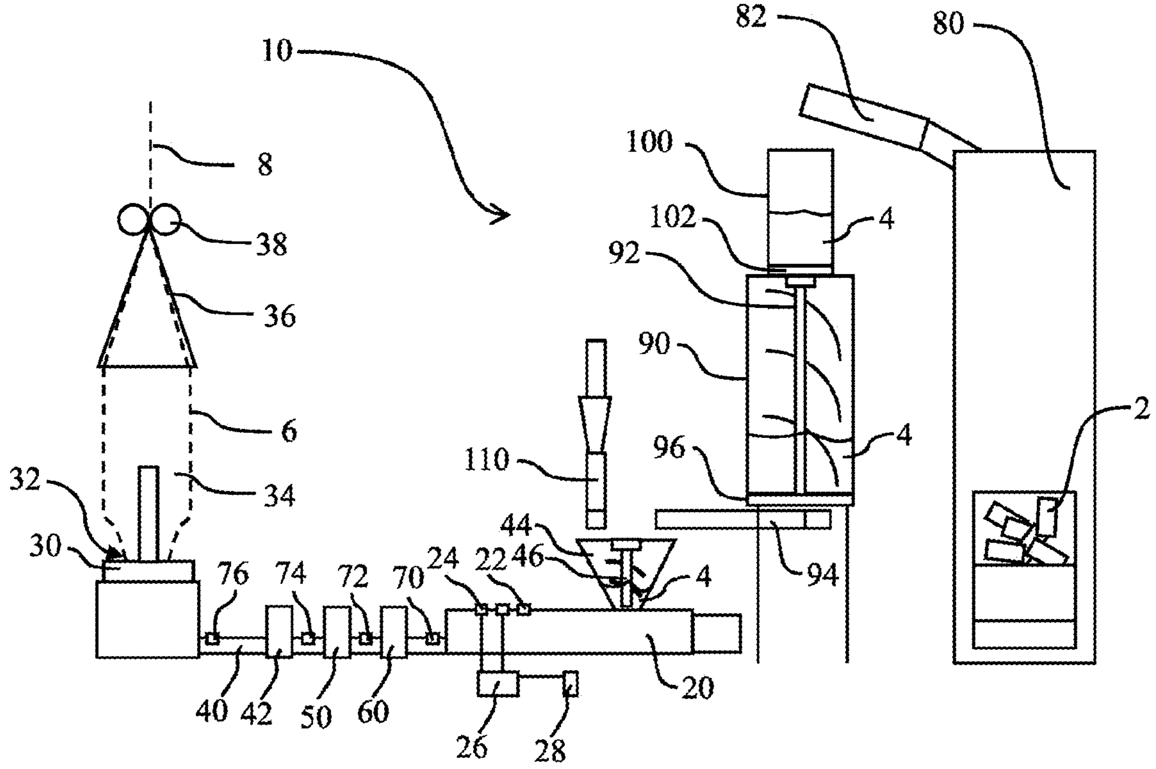
10
8
38
36
6
32
34
30
76
74
72
70
24
22
46
44
4
40
42
50
60
26
28
20
110
82
80
100
102
92
90
96
94
2

FILM BLOWING MACHINE AND METHOD FOR PRODUCING A FILM WEB

CROSS REFERENCE TO RELATED PATENT APPLICATIONS

This is a U.S. national phase patent application of PCT/DE2022/100976 filed Dec. 22, 2022 which claims the benefit of and priority to German Patent Application No. DE 10 2021 134 416.6, filed on Dec. 22, 2021, the entire contents of each of which are incorporated herein by reference for all purposes.

TECHNICAL FIELD

The invention relates to a blown film installation, the use of a twin-screw extruder for feeding an annular nozzle of a blown film installation and a method for producing a film web.

More precisely, the invention relates to a blown film installation for producing a film web from a recycled material, the use of a twin-screw extruder for feeding an annular nozzle of a blown film installation and a method for producing a film web from a recycled material.

BACKGROUND

Blown film installations are already known in various embodiments from the prior art. In particular, the blown film installations of the prior art are also already able to produce a film web from recycled material. Ordinarily, a blown film installation can have an extruder which serves to melt and homogenize the material to be extruded into a melt. Furthermore, it is in particular known that an annular nozzle is provided for extruding a film tube and the blown film installation has an annular nozzle melt pump for conveying the melt to the annular nozzle in a melt flow between the extruder and the annular nozzle. In addition, the blown film installation can have a tube formation zone for longitudinal and transverse drawing or, respectively longitudinal and transverse stretching of the film tube. Additionally, in the case of the blown film installations in the prior art, a cooling means can also be provided for the film tube moving in the machine direction and the blown film installation can have a collapsing section beyond the tube formation zone for collapsing the film tube into a double-layer film web. In addition, it is possible that the blown film installation has a pair of draw-off rollers beyond the cooling means for drawing off the film tube in the prior art.

The disadvantage of the known solutions is, in particular, that the material—in particular films from production and/or utilization, which are to be supplied to recycling-initially has to be comminuted, melted and pelletized before the material can be extruded in the next step. This can lead, inter alia, to process steps additionally being necessary, lower material quality and higher energy consumption.

SUMMARY

It is therefore a problem of the present invention to at least partially remedy the disadvantages described above. In particular, it is a problem of the present invention to provide rapid material changes and changeover times, an improved melt quality having a high proportion of recyclate, an improved layer distribution, low-tension and low-shrinkage and/or high-tension and high-shrinkage films, a high degree of automation and/or good operability.

The aforementioned problem is solved by a blown film installation having the features of the description and the drawings. Of course, features and details which are described in connection with the blown film installation according to the invention also apply in connection with the method according to the invention, and in each case vice versa so that, as regards the disclosure, reference is or can always be reciprocally made to the individual aspects of the invention.

According to the invention, a blown film installation for producing a film web from a recycled material is proposed, which, in keeping with a generic blown film installation, can have an extruder for melting and homogenizing the recycled material into a melt and an annular nozzle for extruding a film tube. Furthermore, the blown film installation has in particular an annular nozzle melt pump in a guide for a melt flow between the extruder and the annular nozzle for conveying the melt to the annular nozzle. In the present case, the melt flow is also to be understood to be a guide for such a melt flow, so that the features do not necessarily relate to a blown film installation having a melt, but rather also to a blown film installation having a guide for a melt flow.

In addition, it can be provided that the blown film installation has a tube formation zone for longitudinal and transverse drawing of the film tube as well as a cooling means for the film tube moving in the machine direction. The blown film installation can additionally have a collapsing section beyond the tube formation zone for collapsing the film tube into a double-layer film web and a pair of draw-off rollers beyond the cooling means for drawing off the film tube.

Furthermore, it is proposed that the extruder of the blown film installation be configured as a twin-screw extruder. The twin-screw extruder is a multi-shaft extruder. In plastic technology, it is used to prepare and shape plastic melts. In this case and to this end, the recycled material or a mixture of materials is conveyed with the recycled material through a heated cylinder by means of two intermeshing rotating screw shafts, and melted. Twin-screw extruders are usually divided into tangential or closely intermeshing co-rotating twin-screw extruders or tangential or closely intermeshing counter-rotating twin-screw extruders on the basis of the center distance between the two screw shafts and the direction of rotation thereof. The counter-rotating twin-screw extruder introduces less shear into the material to be extruded and therefore puts little stress on it. The counter-rotating twin-screw extruder is therefore preferably used during the processing of temperature-sensitive materials. In the present case, the co-rotating twin-screw extruder, in particular the closely intermeshing co-rotating twin-screw extruder, is particularly preferred.

In other words, twin-screw extruders can be divided into counter-rotating and co-rotating designs. Within these designs, a distinction is made between meshing and non-meshing screws. In the case of intermeshing screws, the flights of the one screw usually engage in the flights of the other screw, while, in the case of non-intermeshing screws, the screw profiles do not overlap in the axial direction. A further distinguishing feature is the position of the screws relative to one another.

A distinction is usually made between parallel screws and conically arranged screws.

Intermeshing counter-rotating twin-screw extruders usually form C-shaped, closed conveying chambers which convey the extrusion composition through the extruder regardless of its tribological properties. This type of substance transport is referred to as forcible conveying. The screws rotate apart on the top-comparable to a gear pump—in order to make it easier to draw in the material. Due to the closed conveying chambers, the mass throughput is substantially independent of the back pressure. A calender flow develops in the engagement region of the screws, as a result of which high shearing forces occur in the gaps. These forces can be exploited for dispersing additives. Counter-rotating twin-screw extruders are predominantly deployed for processing PVC. Difficulties arise during the processing of PVC due to the wall slip tendency and the thermal sensitivity of the material. Thanks to the deployment of counter-rotating twin-screw extruders, the material is forcibly conveyed and a narrow dwell time spectrum is achieved. On the one hand, this counteracts wall slip and, on the other hand, this prevents excessive degradation of the material due to excessive thermal stress.

In the case of conical twin-screw extruders, the screw axes are no longer parallel, but rather arranged at an angle, so that the center distance of the screws reduces in the direction of the discharge zone. The conical design offers advantages including, inter alia, a shorter installation length with a comparable throughput, less shearing in the discharge region due to the decreasing screw peripheral speed and easier torque application due to the larger center distances. Three substantial distinctions can be made. A constant, decreasing, or increasing flight depth can make it possible to adapt the volume needed to the respective task.

As a general rule, twin-screw extruders having intermeshing co-rotating screws do not constitute closed conveying chambers, but rather constitute an axially open system. As a consequence, no forcible conveying takes place, but rather the conveying is based, for the most part, on the so-called drag flow. The screws preferably rotate with the same angular velocity and the same direction of rotation. The extrusion composition is conveyed in channels which enclose both screws helically in the form of a figure eight, wherein the cross-section narrows in the engagement region due to the geometry. A part of the melt is forcibly conveyed regardless of the adhesion conditions; this happens due to the geometric conditions in the engagement region. At all points of the engagement region, both screws slide closely past each other with the same relative velocity; as a result, the adhering extrusion composition is scraped off when there is sufficiently little clearance between the screws. Co-rotating twin-screw extruders also constitute important preparation machines due to this self-cleaning effect.

Nowadays, the co-rotating twin-screw extruders are utilized in many industrial sectors, but the main area of application (based on the installed machines) is by far the plastics industry. Here, co-rotating twin screws are predominantly deployed in the preparation of plastic materials, but also increasingly in direct processing during extrusion and injection molding. In particular, the advantages gained in these sectors are the fact that there is no need to carry out a further melting (saving energy and, at the same time, avoiding damage to the polymers due to two-fold melting), and that the formulation freedom results in greater flexibility in terms of setting material properties. Further significant areas of application for these machines are the rubber and food industries.

Twin-screw extruders can generally have a modular design in order to adapt to a plurality of processing and product requirements. This applies to both the cylinder and the screws. The extruder screws preferably consist of elements which are pushed onto a central shaft and attached. The advantages of such a design are, inter alia: easy modification of the screw geometry for test setups when starting up installations or in the event of changed process conditions, standardization of the screw elements and the formation of different and optimized process zones.

Typical process zones of a twin-screw extruder are:
- the intake zone,
- the melting zone,
- the distributive mixing zone,
- the dispersive mixing zone,
- the degassing zone, and
- the discharge zone.

The solid plastic is usually supplied to the extruder in the intake zone. The solid is subsequently conveyed in the direction of the discharge zone and compressed. A further task of the intake zone is preferably to remove air which is drawn in as well. The conveying capacity of the solids conveying zone depends on the free screw volume, the speed and the bulk density of the solid.

The plastic can be supplied to the twin-screw extruder via a funnel and/or via a side feeder. In any case, it must in particular be taken into account during metering in general and when designing funnels and/or side feeders that plastic waste (granulate material and/or fluff) does not readily flow as a consequence of its low bulk density. This can be substantially attributed to the unfavorable shape and the associated low bulk density: in the case of fluff, it is due to the nature of the material itself ("scraps"); in the case of recycled granulate material grains, it is due to their unfavorable grain shape and an uneven grain shape distribution. Without particular measures, the result is frequently the formation of bridges and tunnels in the funnel. Whilst bridge formation interrupts the mass flow completely, tunnel formation results in segregation and the formation of dead zones, for example in the funnel. Both effects therefore frequently lead to production interruptions or significant fluctuations in throughput. This problem can be countered in simple cases by a suitable funnel wall inclination. The next step is then preferably so-called intake fittings in the funnel. If this is also unsuccessful, another possibility is using an agitator or compression screw in the funnel. In addition to polymers in granulate material or fluff form, powdery or liquid additives such as, e.g., fillers ($CaCo_3$, $TiO_2$) or processing aids can also be supplied in the downstream region of a twin-screw extruder.

One advantage of the twin-screw extruder is that the starting material should not necessarily be preferably present as granulate material, as in the case of the single-screw extruder, but rather the supply in the form of scraps/snippets to so-called "fluff" is also possible. In order to be produced in the "fluff" form, the starting material must be comminuted from its original shape, e.g., in the form of sheet material (e.g., as a roll), edge strips, clippings or PCR goods after sorting (film or laminate in size DIN A6 to DIN A0, or larger), melt lumps, film/laminate scraps which were previously comminuted after sorting and cleaning in a first step.

As a basic operation, comminution is practically a prerequisite for all the subsequent preparation and recycling processes, wherein the grain sizes selected have to be adapted to the subsequent processes. At the same time, the grain sizes should not be smaller than necessary, since high costs are associated with the comminution. In addition to a suitable grain size, a uniform grain size distribution and grain shape are also required, since otherwise different geometric dimensions have a major negative impact on subsequent sorting.

The material properties, in particular the toughness, elasticity and thermal stability of the feedstock are of decisive importance for the comminution performance and the comminution success. The introduction of energy is possible in various ways. However, in the case of thermoplastics, stresses caused by pressure, shearing and impact often only lead to inadequate results. Under normal conditions, pressure and impact are absorbed by plastic grains in a tough-elastic manner, while shearing leads to melting of the plastic particles. Therefore, the types of stress used in large-scale comminution are, above all, cutting and impingement.

During cutting, the grain is separated along the cutting edge due to a shearing stress in the shearing gap. That is to say that the difference between the shearing and cutting forms of stress is that during cutting, the shearing has a very limited local effect on the shear gap, while the shearing form of stress affects the entire grain. Therefore, in the case of solids, shearing only leads to inadequate comminution results.

The comminution of the grain by impingement is achieved by the inertial forces, in that the present kinetic energy, on colliding with one or more grains or by impact with a solid body at high relative velocities, is converted into deformation work. The difference between the pressure, impact and impingement stresses lies in the relative velocities of the particles to one another or between particles and the solid. While relative velocities<5 m/s are attained under pressure stress, they are >5 m/s under impact. During comminution by means of impingement, on the other hand, relative velocities of between 20 m/s and several 100 m/s are applied. Very high relative velocities are applied, especially in the case of ultra-fine comminution.

In order to produce fluff for feeding a twin-screw extruder from the waste mentioned above, comminution by cutting is an option.

Cutting roller comminutors (also known as rotor shears, twin-shaft cutters or shredders) or more rarely guillotine shears (also called splitters) are, above all, deployed for comminution by cutting.

In the case of the cutting roller comminutor, the supplied material is gripped by tearing teeth which are arranged on parallel, counter-rotating shafts, and drawn in between the shafts. The waste is comminuted partly by cutting and partly by tearing until it can leave the intermeshing rollers at the bottom.

In addition to the cutting roller comminutors, cutting mills are frequently deployed. These mills are ideal for comminuting tough-elastic materials and can therefore be deployed for almost all plastics. Cutting mills of different designs are deployed, but they all work according to the same principle. Gravity causes the material which is to be comminuted to enter the intake region of the rotor, which is open at this point, via the delivery chute. The material to be ground is circulated by the rotor and continually comminuted between the rotor and bed knives. If the particle size of individual grains is smaller than the mesh size of the screen bottom deployed, they leave the grinding chamber due to gravity and partly due to centrifugal force.

Cutting roller comminutors can receive the wide variety of film and laminate waste particularly well and comminute it into fluff and are therefore particularly preferably suitable for producing fluff in an installation having an intermeshing counter-rotating twin-screw extruder in direct processing in film extrusion.

The melting or plasticizing zone serves to convert the solid into a melt. Moreover, fillers are also to be pre-dispersed. Depending on the following process zones, it is not always necessary to achieve a degree of melting of 100% at the end of the plasticizing zone.

Unmelted solid particles can be melted in following zones, such as the dispersive mixing zone. The tasks of the distributive mixing zone are the distribution of solids and fluids in the melt as well as the homogenization of the composition temperature. The mixing effect is attained by dividing and redirecting the melt flow. Mixing elements are generally designed such that shear-intensive dispersion is minimized, leading to reduced self-cleaning. In the dispersive mixing zone, solids or polymer agglomerates as well as liquid droplets are to be broken up by high shearing forces. In addition to the shearing stress, the duration of the stress is also decisive for the breaking-up effect.

The degassing zone serves to remove water, residual monomers and dissolved gases. In order to prevent the melt from escaping through the degassing opening, the pressure of the melt must first be adapted to the ambient pressure. The channels upstream of the degassing zone must be completely filled in order to prevent an extraction of constituents which have not yet been incorporated, or the sucking in of air via the filling funnel. This is attained by suitable accumulation elements.

Degassing offers the possibility of removing low-molecular components, gases or air from the melt during processing by extrusion. However, the substances to be degassed differ in part due to the special composition of the recycled materials.

Degassing tasks which occur more frequently during the recycling of plastics are:

Drying: extraction of residual moisture, as a result of which a time-consuming and expensive pre-drying of the material can be dispensed with under certain circumstances; bubble formation and molecular weight reduction due to hydrolysis can be prevented.

Shift of equilibrium: if low-molecular constituents are extracted, in particular from polycondensates, the equilibrium is shifted in the direction of high-molecular chains and the molecular weight increases.

Removal of external contaminants: highly volatile, mostly organic compounds, which adhere to the plastics in the form of contaminants are removed from the melt, e.g., fats, oils as well as, in some cases, printing inks or varnishes.

Removal of internal contaminants: substances which have diffused into the material during the usage of the plastic and which cannot be removed by a washing process are removed by degassing, e.g., petrol, diesel, antifreeze.

Removal of low-molecular degradation products: degradation products released during processing or usage, which are present in the form of chain fragments, monomers or oligomers and permanently impair the usage and processing properties of the plastic, are removed.

Degassing of solvents: solvents which have found their way into the material due to partially deployed cleaning and separation stages of the preparation are removed.

Admittedly, substances which should remain in the material are also simultaneously partially removed with the degassing. These can be short-chain polymer components as well as added additives, in particular stabilizers, antioxidants, UV absorbers, plasticizers, etc.

The following relationships apply to the degassing capacity:

As the temperature increases, factors such as viscosity, vapor pressure, volatility and diffusion equilibrium are positively influenced and bring about increased degassing performance.

The degassing capacity increases as the pressure falls in the degassing zone.

A large phase interface combined with a simultaneously low layer thickness promotes degassing. Phase interfaces and layer thicknesses are predefined by the dimensions of the degassing apparatus. Since the layer thickness cannot be made arbitrarily thin, attempts are made to increase the degassing performance through constant surface renewal, i.e., high speeds.

A long dwell time in the degassing zone likewise leads to a better degassing performance. This relationship is contrary to the aim of economy and, thus, short dwell times.

A twin-screw extruder having intermeshing co-rotating screws, as deployed in direct processing, advantageously has, in addition to a so-called atmospheric degassing zone, at least one, but preferably two, degassing zones to which a vacuum is applied. The pressure in such a process zone is in any case below 1 bar down to 1 mbar. Typical pressures are between 800 and 10 mbar, preferably between 500 and 50 mbar.

The discharge zone serves to build up the pressure required for the following processes.

During the melt filtration of plastics, the material is conducted through a filter element during melting in order to remove impurities and other solids from the plastic. The plastic is conducted through a filter element under pressure and at high temperatures, which filters out the solids from the plastic. Melt filtration is an important step during recycling of plastics as it helps to improve the quality of the recycled material and remove as many contaminants as possible. It is frequently deployed in combination with other techniques such as degassing in order to make the recycled material as pure as possible.

Filtering or filtration is generally understood to mean the separation of solid or liquid particles from fluids with the aid of a filter medium. In extrusion, the filtration therefore has the task of precipitating all kinds of foreign particles in accordance with a selected filter fineness and thus providing a melt which is as pure as possible.

This problem arises to an increased extent during the processing of plastic waste, which, despite complex cleaning stages during the preparation, still contains a much greater volume of contaminants than is the case with new plastic material.

For process optimization and for reasons of economy, the following requirements are to be met by a melt filtration:

Filtration at approximately constant pressure and constant temperature

Filter change without interrupting and/or influencing production

Minimal additional dwell time of the melt

Minimal pressure drop in the filter media

Longest possible service life of the filters

However, due to the sometimes very high degree of contamination in the case of plastic waste, conventional filtration systems for virgin material quickly reach their limits with regard to these requirements. A foreign body quantity of 0.3% by volume is already referred to as a very large quantity of contaminants for the filtration, and even for a screen wheel filter which is one of the continuously operating filter systems, an upper limit of 0.5% by volume of contaminants applies for economical work.

Typical filter finenesses depend on the area of application and, thus, the melt filter used. Large-area filters are deployed when the production process runs continuously, few formulation and batch changes are needed and the end product requires a high degree of purity, that is to say, for instance, in the case of products which have to be crystal clear and without visible particles. This frequently requires filter fineness below 50 μm, in special cases down to below 5 μm. Screen changers, on the other hand, are designed for methods having frequent formulation and/or color changes and/or high levels of contamination (e.g., recycling). Filter finenesses>50 μm are used. Typical filter finenesses during the deployment of co-rotating twin-screw extruders in direct processing in a film extrusion installation are between 50 μm and 500 μm, preferably between 80 and 200 μm. Suitable filter surface areas per screen (opening) are between 10 $cm^2$ and 1.5 $m^2$ preferably between 50 and 500 $cm^2$.

As a general rule, the complete process part of a twin screw (cylinder and screws) has a modular construction and can thus be adapted very flexibly to a wide variety of process tasks. As a general rule, the process part is heated electrically or with saturated steam (in the case of very large units) and can be cooled with water (evaporation) or air.

For torque transmission, the screws frequently have modified toothing, multiple wedge or polygon geometries. On account of the levels of safety necessary during the transmission of the very high torques, feather key connections are practically no longer utilized.

The lengths of screws and cylinders are indicated based on the outer screw diameter (L/D). The demand for long screw lengths (L/D) has increased in recent years due to the requirements in the processing of polymer blends such as, e.g., intensive mixing and kneading processes, multi-stage supply of additives, multi-stage degassing, etc.: the screw lengths (L/D) influence the length of time for mixing and kneading processes (dispersive and distributive mixing), chemical reactions in compounding processes, etc. In short, a longer L/D leads to a longer dwell time. Today, twin-screw extruders are generally deployed with screw lengths L/D of 12 and more for laboratory extruders and up to L/D=420 for extruders in the chemical industry. Typical ratios during the deployment of co-rotating twin-screw extruders in direct processing in a film extrusion installation are between L/D=30-60, preferably between L/D=40-50.

Usual housings are 3 or 4 D long, in some cases they are even up to 8 D for economic reasons. Housings are designed for a wide variety of process tasks. These tasks correspond to the typical process zones and include, inter alia, intake, melting, supply with rearwards ventilation, blending in, degassing and discharge/pressure build-up.

Typical speeds of a co-rotating twin-screw extruder were initially in the range of 100-200 rpm in the middle of the last century following their market launch. Nowadays, the maximum speeds have reached a range of 600-1500 rpm and there is a tendency to increase year by year. A high screw speed makes it possible to improve the throughput and to improve the mixing action under high shear forces. A very high screw speed of up to 2500 rpm is indicated as a particular example, which is sometimes used to control the morphology formation of polymer alloys. Typical speeds during the deployment of co-rotating twin-screw extruders in direct processing in a film extrusion installation are between 100 and 600 rpm, preferably 200 and 500 rpm.

For the process engineering design of the co-rotating twin screws, a number of geometric and drive parameters are decisive:

The so-called screw profile results from the ratio of the outer diameter Da and the inner diameter Di: Da/Di. The center distance a of the two screws a is then: (Da+Di)/2. In practice, because of the necessary clearances, a slightly larger center distance is embodied. The projected cross-sectional area of the screw, more precisely of the two screw elements, at any point of the extruder is constantly smaller than the cross-sectional area of the eight-shaped cylinder. In addition to the outer and inner diameter, the resulting free cross-sectional area is a further geometric parameter of an intermeshing co-rotating twin-screw extruder. The free cross-sectional area Afree increases as the diameter ratio Da/Di increases. As a result, there is more free volume in the process section for intake, conveyance and degassing. The so-called flight depth h is calculated as (Da−Di)/2.

Typical outer diameters of a co-rotating twin-screw extruder today are between approx. 12 mm in the case of laboratory extruders and up to approx. 260 mm in large production installations. Typical outer diameters of co-rotating twin-screw extruders during deployment in direct processing in a film extrusion line are between 30 and 180 mm, preferably between 50 mm and 120 mm and particularly preferably between 55 and 95 mm.

In addition, the following are important for the possible throughputs:

The specific torque, the quotient of the installed torque per screw shaft Md and the center distance a to the third power: $Md/a^3$ and the screw speed n.

In order to attain a higher throughput and a better mixing effect of the twin-screw extruder, the Da/Di ratio and the specific torque have constantly increased since the launch of the co-rotating twin-screw extruder in the middle of the last century up to the present day:

If the diameter ratio Da/Di was initially only 1.22, it has increased over the years from 1.44 to 1.55, then 1.66 and finally even 1.8.

The specific torque of the first generation of co-rotating twin-screw extruders in the middle of the last century was only 3 to 5 $Nm/cm^3$; typical values today are around 15 to 20 $Nm/cm^3$. A higher specific torque makes possible a better mixing action with greater throughput. In addition, this means that a polymer can be processed at lower processing temperatures (i.e., higher melt viscosity and less thermal degradation).

The recycled material is preferably a plastic or a mixture of plastics, particularly preferably a plastic or a mixture of plastics from the group of polymers, polycondensates such as polyethylene (LDPE, LLDPE, mLLDPE, HDPE, MDPE, VLDPE, etc.), polypropylenes (homo- and copolymers, compounds), thermoplastic materials, ionomers, ethylene copolymers (EVA, EVOH, EPM/EPDM, EMMA, EAA, EEA, CPE, etc.), cyclic olefin copolymers, polyamides (PA 6, PA 66, PA 6/66, PA 11, etc.), thermoplastic elastomers (TPE-E, TPE-O, TPU), terephthalates (polyethylene terephthalate (PET), polybutylene terephthalate (PBT)), polyisobutylene (PIB), polystyrene (PS), bio-based plastics and biodegradable plastics (PLA, PHA, TPS, PCL, PBAT, PBS).

In addition, the recycled material can contain additives (antioxidants, antistatic agents, colorants, fillers such as $CaCO_3$, $TiO_2$, lubricants, antiblocking agents, adhesion promoters, etc.). The recycled material can expressly also be printed or have labels, etc. attached to it. The twin-screw extruder has a particularly good mixing effect, as a result of which the plastic used can be prepared. In particular, the recycling and/or blending in of additives using a twin-screw extruder is particularly advantageous.

According to one embodiment, the blown film installation has a filter having at least one filter element for filtering the melt from an unfiltered side to a filtered side. The filter serves as a dirt trapping screen. The filter is preferably a filter from the group consisting of melt filters, extruder screens, filter disks and strainer screens. In this case, the filter element can be single-layered or multi-layered or pleated. The filter element can include a metal wire mesh, metal non-woven fabric and/or sintered fabric laminate.

The filter is preferably arranged in the melt flow between the extruder and the annular nozzle. The filter can also be part of the extruder. The filter is preferably arranged between the extruder and the annular nozzle melt pump.

According to one embodiment, the filter has a cleaning device which continuously and/or discontinuously replaces the filter element. In the present case, the term replaced is to be understood to mean both cleaning of a filter element and the introduction of a new filter element which was not previously used as a filter element or which was cleaned prior to being used again. The introduction can be carried out manually or, preferably, automatically.

According to one embodiment, the cleaning device is configured to replace the filter element during the operation of the installation, that is to say while the film web is being produced. That is to say that, in the case of this embodiment, it is not necessary to stop the blown film installation in order to replace the filter element.

According to one embodiment, the cleaning device has a rotatable filter element or a rotatable cleaning element for replacing the filter element. The rotatable filter element can rotate on a scraper element in such a way that dirt which is filtered out is stripped from the filter element. Alternatively, a scraper element can rotate on the filter element in order to strip dirt which is filtered out from the filter element. According to one embodiment, the cleaning device has a filter element which can be moved with respect to the melt flow in which it is engaged or a cleaning element which can be moved with respect to the melt flow in which it is engaged, for replacing the filter element.

According to one embodiment, the cleaning device has a deflection device for cleaning the filter element by temporarily conducting the melt from the filtered side to the unfiltered side, that is to say in the opposite direction to the usual melt flow. As a result of this deflection of the melt flow, the debris which is filtered out is removed from the filter element. The cleaning device preferably has a cleaning outlet through which the melt, which has been conducted from the filtered side to the unfiltered side, is discharged. In particular, it is preferred that the melt to be discharged is a melt which includes the dirt which has been filtered out.

According to one embodiment, the cleaning device has a screen changer which is configured to divide up the melt flow and thus conduct it through multiple filter elements. The screen changer is preferably configured to conduct the melt flow through only one of the filter elements instead of through a first and a second filter element, so that the first filter element can be replaced while the second filter element is located in the melt flow.

According to one embodiment, the cleaning device or, respectively the screen changer is configured to conduct the melt flow optionally through individual and/or through all the available filter elements.

According to one embodiment, the blown film installation has a filter melt pump between the extruder and the annular nozzle melt pump, which pumps the melt to the filter. The extruder is conceived in such a way that a pressure is built up in the melt flow in order to overcome the flow resistance of the extruder. In the case of an embodiment having the filter, the pressure of the extruder is often not sufficient in order to also overcome the flow resistance at the filter. In this case, the filter melt pump which overcomes the flow resistance of the filter is preferred.

The filter melt pump is preferred so that a particularly constant supply of material per unit of time and, thus, a constant material processing is made possible.

According to one embodiment, the twin-screw extruder has at least one degassing unit which makes it possible to extract impurities and contaminants. The degassing unit can be configured as a degassing zone as part of the extruder. Volatile components can be extracted from the melt with the degassing unit. In order to improve the degassing, it is preferred that the filling degree in the twin-screw extruder is below 100%, in particular it is preferred that the filling degree is below 80%. Such a filling degree is preferred since otherwise the melt would be pressed into degassing connectors and would escape from the degassing unit.

According to one embodiment, the twin-screw extruder has at least one degassing unit which is configured as an atmospheric degassing unit. In the case of this design, the volatile components can be discharged from the degassing unit without applying a negative pressure.

According to one embodiment, the twin-screw extruder has at least one degassing unit which is configured as a vacuum degassing unit. In the case of this design, a negative pressure is applied to the degassing unit. The negative pressure can be created by a vacuum pump. This design makes it possible to degas volatile components particularly thoroughly. It is preferred that the degassing unit, in particular the vacuum degassing unit, has a means for collecting the volatile components, preferably in the form of condensate.

According to one embodiment, the extruder has a recycled material supply with a stuffing screw. Thanks to the stuffing screw, the recycled material can be fed to the extruder in a particularly uniform manner. The recycled material supply preferably has a funnel in which the stuffing screw is arranged. The stuffing screw is preferably driven by a drive which is independent of the extruder.

According to one embodiment, the blown film installation has at least two pressure sensors for capturing pressures within the guide for the melt flow, preferably in each case in the guide for the melt flow at the extruder and upstream of the annular nozzle. The pressure sensors are configured to capture the melt pressure in the melt flow during the operation of the blown film installation.

According to one embodiment, the blown film installation has at least two pressure sensors for capturing the melt pressure in each case in the melt flow at the extruder and upstream of the annular nozzle. The first pressure sensor is preferably arranged immediately at the extruder or beyond the extruder. The second pressure sensor is preferably arranged immediately upstream of the annular nozzle or at the annular nozzle. In an alternative embodiment, the second pressure sensor is arranged upstream of the annular nozzle melt pump. The extruder and/or the annular nozzle melt pump and/or the recycled material supply can preferably be regulated as a function of the melt pressure in the melt flow which is captured by the first and/or second pressure sensor at the extruder and/or upstream of the annular nozzle.

According to one embodiment, the blown film installation has two additional pressure sensors for capturing the melt pressure in the melt flow upstream and downstream of the filter. That is to say that these additional pressure sensors are pressure sensors which are present additionally to the pressure sensors mentioned above. These additional pressure sensors can be installed immediately upstream and downstream of the filter. However, it is preferred that the additional pressure sensors are positioned immediately upstream of the filter and immediately upstream of the annular nozzle. In the case of this design, the second pressure sensor is preferably positioned immediately downstream of the filter.

The extruder and/or the annular nozzle melt pump and/or the recycled material supply and/or the deflection device of the filter and/or the filter element changing apparatus can preferably be regulated as a function of the melt pressure upstream and/or downstream of the filter.

The extruder and/or the annular nozzle melt pump and/or the recycled material supply and/or the deflection device of the filter is/are particularly preferably regulated as a function of the pressure sensors for capturing the melt pressure in the melt flow at the extruder and upstream of the annular nozzle and the additional pressure sensors for capturing the melt pressure in the melt flow upstream and downstream of the filter.

According to one embodiment, the blown film installation has a storage silo for stocking the recycled material.

According to one embodiment, the blown film installation has a screw conveyor which conveys the recycled material from the storage silo to the recycled material supply. The screw conveyor is preferably arranged horizontally or substantially horizontally.

According to one embodiment, the storage silo has a means for mixing the recycled material within the storage silo. This is preferred since possible blockages of recycled material within the storage silo can consequently be tackled. The means for mixing is preferably a comb system within the storage silo but it can also be, for example, a shaker which shakes the storage silo.

According to one embodiment, the storage silo has a means for determining the degree to which it is filled with the recycled material. The means for determining the filling degree can be a weighing device of the storage silo. It is preferred that the means for determining the filling degree is an optical and/or capacitive sensor.

According to one embodiment, the storage silo has a means for determining the recycled material consumption thereof. The means for determining the recycled material consumption is preferably a weighing device of the storage silo. The recycled material consumption can thus be captured via a decrease in weight over time.

According to one embodiment, the blown film installation has a dispensing silo for filling the recycled material in the storage silo.

According to one embodiment, the blown film installation has a shredder for comminuting a starting material. The starting material can be a plastic or a mixture of a plastic from the group mentioned above. The starting material can be present in the form of sheet material, comminuted sheet material, shredded film, etc. The comminuted sheet material can be present in sizes from a few mm up to DIN A0 and large sheet material parts. The shredder is preferably configured to comminute the starting material into recycled material. The recycled material is preferably present as fluff. The recycled material can be present in the form of flakes. The flake size of the recycled material is preferably between 1 mm and 40 mm, the flake size of the recycled material is particularly preferably between 5 mm and 12 mm.

According to one embodiment, the blown film installation has a transport device for transporting the recycled material from the shredder to the storage silo and/or the dispensing silo.

In the case of a design having a dispensing silo, it is preferred that the transport device exclusively conveys into the dispensing silo. The transport device is preferably configured as a conveyor belt and/or as a screw conveyor or as a pressure conveying system. A design having a conveyor belt with a conveyor screw is particularly preferred, since this can convey material in a particularly continuous manner.

According to one embodiment, the blown film installation has a mixing silo for mixing the recycled material with further materials. The blown film installation can also include multiple mixing silos. The mixing silo(s) can also serve as interim storage for various recycled materials. In addition to recycled materials, other extrudable materials can also be stocked in mixing silos. The mixing silo preferably has a mixing device within the mixing silo.

The mixing silo is preferably connected to the storage silo and/or the dispensing silo via a blower and/or a conveyor belt and/or a screw conveyor for introducing the recycled material and/or mixtures thereof.

According to one embodiment, the recycled material supply is configured to additionally or alternatively receive a pelleted and/or granulated material, in addition to the recycled material, in order to convey it to the extruder. The additional material can also be other extrudable materials in addition to the recycled material.

The blown film installation preferably has a pellet metering device for stocking and metering the pelleted material. The pelleted material is preferably virgin material and/or higher-quality recyclates compared to the recycled material.

According to one embodiment, the blown film installation is configured to produce the film web with at least one further layer in addition to a layer made of the recycled material. The blown film installation is preferably configured to produce a film web having 1 to 11 or 13 layers, the blown film installation is particularly preferably configured to produce a film web having 1 to 5 layers.

According to one embodiment, the blown film installation has at least one additional extruder which melts and homogenizes the material of at least one additional layer into a melt. The additional layers are preferably a plastic or a mixture of plastics from the group mentioned above.

The additional extruder can be an additional twin-screw extruder.

According to one embodiment, the blown film installation is configured to produce a film web in which the recycled material is arranged between at least two further layers in the film web.

According to one embodiment, two or more layers are formed by a single extruder. In the case of this embodiment, it is not absolutely necessary for these layers to lie immediately on top of one another.

According to one embodiment, the blown film installation has a machine direction which is oriented substantially vertically in a bottom-top direction.

The invention likewise includes the use of a twin-screw extruder for feeding an annular nozzle of a blown film installation. The blown film installation is preferably configured according to one of the above embodiments.

Moreover, the invention relates to a method for producing a film web from a recycled material preferably on a blown film installation. It is provided that a twin-screw extruder melts and homogenizes the recycled material into a melt, the melt is subsequently conveyed to an annular nozzle via a melt flow with an annular nozzle melt pump. The melt is extruded into a film tube via the annular nozzle and the film tube is subsequently longitudinally and transversely drawn or, respectively longitudinally and transversely stretched at a tube formation zone. The tube formation zone is followed by a collapsing section for the film tube, which combines the film tube into a double-layer film web beyond the tube formation zone. A pair of draw-off rollers is located beyond the collapsing section for drawing off the film tube.

The melt flow can additionally be filtered by means of a filter having at least one filter element within the melt flow by conducting the melt flow from an unfiltered side to a filtered side. The filter is preferably arranged in the melt flow between the extruder and the annular nozzle, the filter is preferably arranged between the extruder and the annular nozzle melt pump.

The filter system is preferably configured according to the filter system, described above, of the blown film installation. A filter melt pump can be provided, which is arranged between the extruder and the annular nozzle melt pump and which pumps the melt to the filter, or, respectively increases a pressure within the melt flow to the filter system.

The twin-screw extruder can additionally have at least one degassing unit as described above, which degasses the melt, as a result of which an extraction of impurities and contaminants takes place.

According to one embodiment, the extruder is filled with the recycled material via a recycled material supply with a stuffing screw as described above.

According to one embodiment, a pressure sensor captures the melt pressure in the melt flow at the extruder, and a further pressure sensor captures the melt pressure in the melt flow upstream of the annular nozzle. A control and regulating device preferably regulates the extruder and/or the annular nozzle melt pump and/or the recycled material supply as a function of the melt pressure in the melt flow at the extruder and/or upstream of the annular nozzle. This makes it possible to extrude recycled material constantly.

According to one embodiment, an additional pressure sensor captures the melt pressure in the melt flow upstream of the filter, and an additional pressure sensor captures the melt pressure in the melt flow downstream of the filter. The first pressure sensor preferably captures the melt pressure immediately at the extruder or beyond the extruder. The second pressure sensor preferably captures the melt pressure upstream of the annular nozzle or directly at the annular nozzle. In an alternative embodiment, the second pressure sensor is arranged upstream of the annular nozzle melt pump and captures the melt pressure there.

A switch-off pressure is preferably monitored by means of the pressure sensor which captures the melt pressure directly at the annular nozzle. The switch-off pressure is intended to provide information as to whether a maximum pressure has been reached in the melt flow. This maximum pressure in the melt flow can be reached if, for example, the temperature at the annular nozzle is too low and the recycled material can no longer be conveyed through the annular nozzle in the required quantity. The pressure sensor, which is arranged directly at the annular nozzle, can be used to regulate the speed of the annular nozzle melt pump. A further pressure sensor for monitoring a further switch-off pressure can be arranged immediately upstream of the filter. The pressure sensor, which is arranged immediately upstream of the filter, can also activate or deactivate regulation of the cleaning device. The pressure sensor, which is arranged immediately downstream of the extruder, is preferably used to regulate the extruder speed. The pressure sensor, which is arranged immediately downstream of the filter, is preferably used to regulate the speed of the filter melt pump and/or the speed of the annular nozzle melt pump.

According to one embodiment, a control and regulating device regulates the extruder and/or the annular nozzle melt pump and/or the recycled material supply and/or the deflection device of the filter and/or the filter element changing device as a function of the melt pressure in the melt flow upstream and/or downstream of the filter.

The control and regulating device particularly preferably regulates the extruder and/or the annular nozzle melt pump and/or the recycled material supply and/or the deflection device of the filter as a function of the pressure sensors for capturing the melt pressure in the melt flow at the extruder and upstream of the annular nozzle and the additional pressure sensors for capturing the melt pressure in the melt flow upstream and downstream of the filter.

In the simplest case, the pressure drop at the filter, that is to say the resistance which the filter has within the filter flow, is captured by means of the pressure sensors. If a threshold value is exceeded, the cleaning device described above of the filter can be activated in order to replace the filter element of the filter.

According to one embodiment, the blown film installation has a screw conveyor which conveys the recycled material from a storage silo as described above to the recycled material supply.

According to one embodiment, the screw conveyor conveys the recycled material from the storage silo as a function of the filling level of the storage silo and/or as a function of the recycled material consumption and/or as a function of the melt pressure in the melt flow at one of the pressure sensors at least, as described above, to the recycled material supply of the extruder.

According to one embodiment, the storage silo is filled with the recycled material from the dispensing silo as a function of the filling level of said storage silo. The storage silo is particularly preferably filled with the recycled material from the dispensing silo as a function of the recycled material consumption of said storage silo. The storage silo is preferably filled in such a way that the amount of recycled material in the storage silo does not fall below a minimum. This is intended to ensure that the recycled material, more precisely the fluff, is supplied to the twin-screw extruder in a constant and uniform manner.

According to one embodiment, the recycled material is mixed with further materials in a mixing silo. In order to introduce the recycled material and/or mixtures thereof into the storage silo, the mixing silo is preferably connected to the storage silo and/or the dispensing silo via a blower and/or a conveyor belt and/or a screw conveyor. This design makes possible a particularly constant material feed to the extruder and a constant material processing.

According to one embodiment, a starting material is comminuted by a shredder into the recycled material. The shredder is preferably configured according to one of the embodiments described above.

According to one embodiment, a transport device transports the recycled material from the shredder to the storage silo and/or to the dispensing silo via a conveyor belt or a pressure conveying system. If the blown film installation has a mixing silo, this is preferably to likewise be filled with shredded material from the shredder.

According to one embodiment, in addition to the recycled material, a pelleted material, preferably a pelleted recycled material, is additionally or alternatively added to the extruder. According to one embodiment, the pelleted material is added to the extruder or the recycled material supply via a pellet metering device.

According to one embodiment, as a function of the filling level of the storage silo and/or of the recycled material consumption and/or as a function of the melt pressure in the melt flow at one of the pressure sensors described above, the pelleted material is additionally or alternatively added to the extruder, in addition to the recycled material.

According to one embodiment, the film web with the recycled material is extruded with at least one further layer of a further plastic in addition to a layer made of the recycled material.

According to one embodiment, the recycled material is extruded with at least one further layer of a further plastic on each flat side.

BRIEF DESCRIPTION OF THE FIGURE

Further advantages and aspects of the invention are set out by the claims and the following description of a preferred exemplary embodiment of the invention, which is explained below using a figure.

The figure shows a detail of a schematic exemplary embodiment of a blown film installation according to the invention.

DETAILED DESCRIPTION OF THE EXEMPLARY EMBODIMENT

The figure shows a blown film installation 10 according to the invention, which is provided for producing a film web from a recycled material 4.

The blown film installation 10 has an extruder 20 for melting and homogenizing the recycled material 4 into a melt. In this exemplary embodiment, the extruder 20 is arranged horizontally on the floor.

The extruder 20 is configured as a twin-screw extruder. In this exemplary embodiment, it is a closely intermeshing co-rotating twin-screw extruder.

In the present case, the recycled material 4 is a plastic from the group of polymers, polycondensates, polyethylenes, polypropylenes, thermoplastic materials, ionomers, ethylene copolymers, cyclic olefin copolymers, polyamides, thermoplastic elastomers, polyethylene terephthalates, polyisobutylene, bio-based and biodegradable plastics.

The extruder 20 is driven by an electric motor. In this exemplary embodiment, the extruder 20 has both an atmospheric degassing unit and a vacuum degassing unit 24. The vacuum degassing unit 24 is operatively connected to a vacuum pump 26. The vacuum degassing unit 24 has a means for collecting condensate. The extruder 20 has a guide for a melt flow 40 to an annular nozzle 30 for extruding a film tube 6. An annular nozzle melt pump 42 is arranged between the extruder 20 and the annular nozzle 30, which conveys the melt to the annular nozzle 30. As a result of this design, a pressure in the melt flow does not have to be built up exclusively by the extruder 20, but rather can be built up and/or increased by the annular nozzle melt pump 42. The annular nozzle 30 is followed by a tube formation zone 32 for drawing the film tube 6 longitudinally and transversely. The blown film installation 10 has a cooling means 34 for the film tube 6 moving in the machine direction. In the present case, the cooling means 34 is air which is blown into or, respectively blown onto the blown film tube 6. Beyond the tube formation zone 32, the blown film installation 10 has a collapsing section 36 for collapsing 36 the film tube 6 into a double-layer film web 8. Beyond this collapsing section 36, a pair of draw-off rollers 38 is arranged, which are provided beyond the cooling means 34 for drawing off the film tube 6.

In this exemplary embodiment, the blown film installation 10 has a filter 50 which is arranged between the annular nozzle melt pump 42 and the extruder 20. In this exemplary embodiment, a filter melt pump 60 is arranged between the filter 50 and the extruder 20. In addition, the extruder 20 has a recycled material supply 44 with a stuffing screw 46. The stuffing screw 46 is driven by an electric motor. In this exemplary embodiment, the blown film installation 10 has a shredder 80 into which a starting material 2 can be fed, which is comminuted into the recycled material 4. The starting material 2 can be a plastic from the aforementioned group. The starting material 2 can be present in the form of sheet material, comminuted sheet material, shredded film, etc. The shredder 80 comminutes the starting material 2 into flakes between 5 mm and 12 mm in size. The shredder 80 has a transport device 82 which conveys the shredded recycled material 4 to a dispensing silo 100. The dispensing silo 100 is arranged above the storage silo 90 and has a metering device 102 via which the recycled material 4 can be discharged, if necessary, into the storage silo 90. In this exemplary embodiment, the metering device 102 is configured as a slide. The storage silo 90 has a means for mixing the recycled material 92, which is configured as an agitator in this exemplary embodiment. The recycled material 4 is guided from the storage silo 90 via a screw conveyor 94 into the recycled material supply 44 at the extruder 20.

The storage silo 90 has means for determining the recycled material consumption. In this exemplary embodiment, the means for determining the recycled material consumption is configured as a weighing device of the storage silo 96. As a result, the consumption of the recycled material 4 can be established as a unit of weight per unit of time. In this exemplary embodiment, the means for determining the filling level of the storage silo 90 is realized by the weighing device of the storage silo 96. As soon as the filling level and, thus, the weight of the storage silo 90 falls below a predetermined value, the storage silo 90 is filled with recycled material 4 from the dispensing silo 100.

The recycled material supply 44 is configured to additionally or alternatively receive a pelleted recycled material 4, in addition to the recycled material 4, in order to convey it to the extruder 20. For this purpose, the blown film installation 10 has a pellet metering device 110 for stocking and metering the pelleted material. The pelleted material is preferably virgin material and/or higher-quality recyclates compared to the recycled material.

A pressure sensor 70 captures the melt pressure in the melt flow at the extruder 20, and a further pressure sensor 76 captures the melt pressure in the melt flow upstream of the annular nozzle 30. A control and regulating device (not depicted) regulates the extruder 20, the annular nozzle melt pump 42 and the recycled material supply 44 as a function of the melt pressure in the melt flow at the extruder 20 and upstream of the annular nozzle 30. This makes it possible to extrude recycled material 4 constantly.

An additional pressure sensor 72 captures the melt pressure in the melt flow upstream of the filter 50, and an additional pressure sensor 74 captures the melt pressure in the melt flow downstream of the filter 50. The first pressure sensor 70 captures the melt pressure beyond the extruder 20. The second pressure sensor 76 captures the melt pressure directly at the annular nozzle 30.

A cut-off pressure is monitored by means of the pressure sensor 76, which captures the melt pressure directly at the annular nozzle 30. The cut-off pressure provides information as to whether a maximum pressure has been reached in the melt flow. This maximum pressure in the melt flow can be reached if, for example, the temperature at the annular nozzle 30 is too low and the recycled material 4 can no longer be conveyed through the annular nozzle 30 in the necessary quantity. The pressure sensor 76, which is arranged directly on the annular nozzle 30, is used to regulate the speed of the annular nozzle melt pump 42. A further pressure sensor 72 for monitoring a further cut-off pressure is arranged immediately upstream of the filter 50. The pressure sensor 72, which is arranged immediately upstream of the filter 50, is also used for regulating the cleaning device. The pressure sensor 70, which is arranged immediately downstream of the extruder 20, is used to regulate the extruder speed. The pressure sensor 74, which is arranged immediately downstream of the filter 50, is used to regulate the speed of the filter melt pump 60 and the speed of the annular nozzle melt pump 42.

LIST OF REFERENCE NUMERALS

2 Starting material
4 Recycled material
6 Film tube
8 Double-layer film web
10 Blown film installation
20 Extruder
22 Atmospheric degassing unit
24 Vacuum degassing unit
26 Vacuum pump
28 Condensate collector
30 Annular nozzle
32 Tube formation zone
34 Cooling means
36 Collapsing section
38 Pair of draw-off rollers
40 Guide for a melt flow
42 Annular nozzle melt pump
44 Recycled material supply
46 Stuffing screw
50 Filter
52 Filter element
60 Filter melt pump
70 Pressure sensor
72 Pressure sensor
74 Pressure sensor
76 Pressure sensor
80 Shredder
82 Transport device
90 Storage silo
92 Means for mixing the recycled material
94 Screw conveyor
96 Weighing device of the storage silo
100 Dispensing silo
110 Metering device
110 Pellet metering device

The invention claimed is:

1. A blown film installation for producing a film web from a recycled material, the blown film installation comprising:
- an extruder for melting and homogenizing the recycled material into a melt;
- an annular nozzle for extruding a film tube;
- a guide for a melt flow between the extruder and the annular nozzle, via an annular nozzle melt pump configured to convey the melt through the guide to the annular nozzle;
- a tube formation zone for longitudinally and transversely drawing the film tube;
- a cooling means for the film tube moving in the-a machine direction;

a collapsing section downstream of the tube formation zone for collapsing the film tube into a double-layer film web;

a pair of draw-off rollers downstream of the cooling means for drawing off the film tube, wherein the extruder is configured as a twin-screw extruder:

a recycled material supply configured to supply the recycled material to the extruder;

a filter having at least one filter element for filtering the melt from an unfiltered side to a filtered side, the filter being arranged in the guide for the melt flow between the extruder and the annular nozzle; and at least two pressure sensors configured to detect pressures within the guide for the melt flow, including a first presso e sensor arranged in the melt flow immediately downstream of the extruder and a second pressure sensor arranged upstream of the annolar nozzle melt pump, wherein the twin-screw extruder comprises:

at least one degassing unit configured to extract impurities and contaminants;

a filter melt pump arranged between the extruder and the annular nozzle melt pump and configured to pump the melt to the filter;

a control and regulating device configured to regulate the extruder and the recycled material supply based on the melt pressure detected by the first pressure sensor and to regulate the annular nozzle melt pump based on the melt pressure detected by the second pressure sensor; and wherein the filter comprises a cleaning device configured to renew the filter element continuously and/or discontinuously.

2. The blown film installation according to claim 1, wherein the at least one degassing unit comprises a vacuum degassing unit and wherein the vacuum degassing unit comprises a condensate collection device configured to collect condensate produced during vacuum degassing.

3. The blown film installation according to claim 1, wherein the recycled material supply comprises a stuffing screw.

4. The blown film installation according to claim 3, further comprising two additional pressure sensors configured to detect the melt pressure in the melt flow upstream and downstream of the filter, wherein the control and regulating device is further configured to regulate the extruder and/or the annular nozzle melt pump and/or the recycled material supply and/or a deflection device of the filter and/or a filter element changing apparatus based on the respective melt pressure detected upstream and/or downstream of the filter.

5. The blown film installation according to claim 1, further comprising a storage silo for stocking the recycled material.

6. The blown film installation according to claim 5, further comprising a screw conveyor which conveys the recycled material from the storage silo to the recycled material supply.

7. The blown film installation according to claim 5, wherein the storage silo has a means for mixing the recycled material within the storage silo.

8. The blown film installation according to claim 5, wherein the storage silo has a means for determining a level to which it is filled with the recycled material.

9. The blown film installation according to claim 5, wherein the storage silo has a means for determining a recycled material consumption thereof, wherein the means for determining the recycled material consumption is a weighing device of the storage silo.

10. The blown film installation according to claim 5, further comprising a dispensing silo for filling the recycled material in the storage silo.

11. The blown film installation according to claim 10, further comprising a shredder for comminuting a starting material, wherein the shredder is configured to comminute the starting material into the recycled material.

12. The blown film installation according to claim 11, further comprising a transport device for transporting the recycled material from the shredder to the storage silo and/or the dispensing silo, wherein the transport device is configured as a conveyor belt and/or as a screw conveyor or as a pressure conveying system.

13. The blown film installation according to claim 12, further comprising at least one mixing silo for mixing the recycled material with further materials, wherein the mixing silo is connected to the storage silo and/or the dispensing silo via a blower and/or a conveyor belt and/or a screw conveyor for introducing the recycled material and/or mixtures thereof.

14. The blown film installation according to claim 1, wherein the recycled material supply is configured to additionally or alternatively receive a pelleted recycled material, in addition to the recycled material, in order to convey it to the extruder, wherein the blown film installation has a pellet metering device for stocking and metering the pelleted material, and wherein the pelleted material is virgin material and/or higher-quality recyclates compared to the recycled material.

15. The blown film installation according to claim 14, wherein the pellet metering device has a screw conveyor which conveys the pelleted material to the extruder.

16. The blown film installation according to claim 1, wherein the blown film installation is configured to produce the film web with at least one further layer in addition to a layer made of the recycled material, wherein the blown film installation has at least one additional extruder which melts and homogenizes the material of the at least one further layer into a melt, and wherein the at least one additional extruder is configured as a twin-screw extruder.

17. The blown film installation according to claim 16, wherein the blown film installation is configured to produce the film web with at least two further layers in addition to the layer made of the recycled material, and wherein the layer made of the recycled material is arranged bet en two of the at least two further layers.

18. The blown film installation according to claim 1, wherein the machine direction is oriented substantially vertically in a bottom-top direction.

19. A method for producing the film web from the recycled material according to claim 1, the method comprising steps of:

a. the twin-screw extruder melts and homogenizes the recycled material into the melt, b. the melt is conveyed to the annular nozzle via the melt flow with the annular nozzle melt pump, c. the melt is extruded into the film tube via the annular nozzle, d. the film tube is longitudinally and transversely drawn at the tube formation zone, e. the collapsing section for the film tube combines the film tube beyond the tube formation zone into the double-layer film web, and f. the blown film installation has the pair of draw-off rollers beyond the collapsing section for drawing off the film tube.

20. The method according to claim 19, wherein the melt flow is filtered by means of the filter having the at least one filter element within the melt flow by conducting the melt flow from the unfiltered side to the filtered side.

21. The method according to claim 20, further comprising renewing the filter element continuously and/or discontinuously by means of the cleaning device the filter.

22. The method according to claim 20, further comprising pumping the melt to the filter by means of the filter melt pump arranged bet extruder and the annular pozzle melt pump.

23. The method according to claim 19, wherein the melt is degassed in the twin-screw extruder via the at least one degassing unit, as a result of which an extraction of the impurities and the contaminants takes place.

24. The method according to claim 19, wherein the extruder is filled with the recycled material via the recycled material supply with a stuffing screw.

25. The method according to claim 19, further comprising:

a. the first pressure sensor which captures a melt pressure in the melt flow at the extruder, b. the second pressure sensor which captures the melt pressure in the melt flow upstream of the annular nozzle, and c. the control and regulating device which regulates the extruder and the recycled material supply based on the first pressure sensor and regulates the annular nozzle melt pump based on the second pressure sensor.

26. The method according to claim 25, further comprising:

a. a third pressure sensor which captures the melt pressure in the melt flow upstream of the filter, b. a fourth pressure sensor which captures the melt pressure in the melt flow downstream of the filter, and c. the control and regulating device which regulates the extruder and/or the annular nozzle melt pump and/or the recycled material supply and/or a deflection device of the filter and/or a filter element changing apparatus as a function of the melt pressure in the melt flow upstream and/or downstream of the filter.

27. The method according to claim 26, wherein the control and regulating device regulates the extruder and/or the annular nozzle melt pump and/or the recycled material supply and/or the deflection device of the filter as a function of the first pressure sensor for capturing the melt pressure in the melt flow at the extruder and the second pressure sensor for capturing the melt pressure in the melt flow upstream of the annular nozzle and the third pressure sensor for capturing the melt pressure in the melt flow upstream of the filter and the fourth pressure sensor for capturing the melt pressure in the melt flow downstream of the filter.

28. The method according to claim 27, further comprising a screw conveyor which conveys the recycled material from a storage silo to the recycled material supply.

29. The method according to claim 28, wherein the screw conveyor conveys the recycled material from the storage silo as a function of a filling degree of the storage silo and/or as a function of the melt pressure in the melt flow at one of the pressure sensors to the recycled material supply of the extruder.

30. The method according to claim 29, wherein the storage silo is filled with the recycled material from a dispensing silo as a function of a filling degree of the storage silo.

31. The method according to claim 19, further comprising a shredder which comminutes a starting material into the recycled material.

32. The method according to claim 31, further comprising a transport device which transports the recycled material from the shredder to a storage silo via a conveyor belt or a pressure conveying system.

33. The method according to claim 32, wherein in addition to the recycled material, a pelleted material is additionally or alternatively added to the extruder, wherein the pelleted material is added to the extruder via a pellet metering device, and wherein the pelleted material is virgin material and/or higher-quality recyclates compared to the recycled material.

34. The method according to claim 33, wherein as a function of a filling level of the storage silo and/or of a recycled material consumption and/or as a function of the melt pressure in the melt flow at one of the pressure sensors, the pelleted material is additionally or alternatively added to the extruder, in addition to the recycled material.

35. The method according to claim 19, wherein the film web with the recycled material is extruded with at least one further layer of a further plastic in addition to a layer made of the recycled material.

36. The method according to claim 35, wherein the further layer of the at least one further plastic is virgin material and/or higher-quality recyclates compared to the recycled material.

37. The method according to claim 19, wherein the recycled material is extruded with at least one further layer of a further plastic on each flat side.

* * * * *